United States Patent Office 3,082,857
Patented Mar. 26, 1963

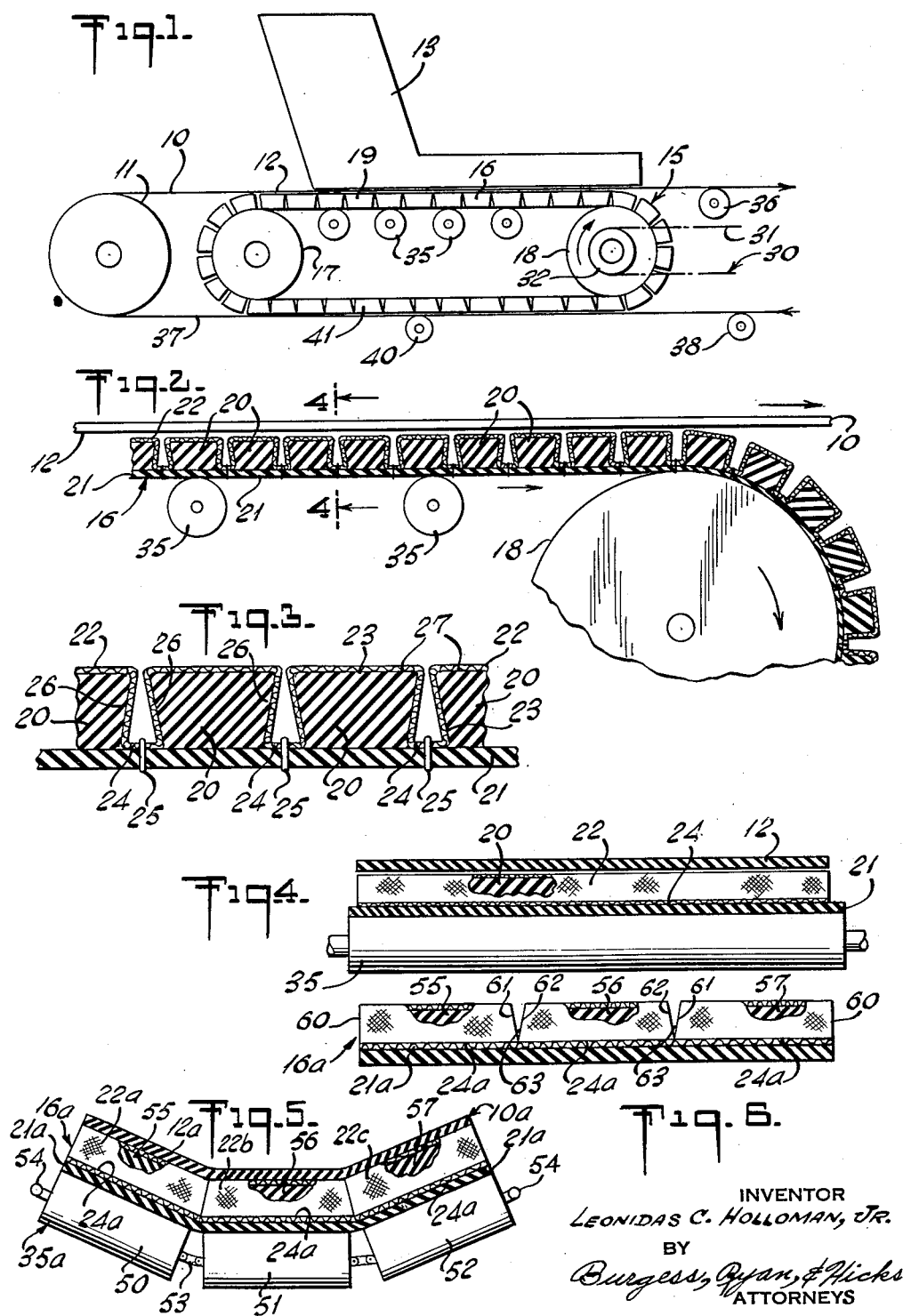

3,082,857
CONVEYOR BELT SYSTEM WITH MEANS FOR ABSORBING LOAD SHOCKS ON CONVEYOR BELT
Leonidas C. Holloman, Jr., Winnetka, Ill., assignor to Hewett-Robins Incorporated, New York, N.Y., a corporation of New York
Filed Aug. 26, 1959, Ser. No. 836,271
1 Claim. (Cl. 198—57)

The present invention relates to conveyor systems and especially to a system by which a conveyor belt is protected against the destructive effects of load impacts at loading or transfer points of the system.

At the loading or transfer points of a conveyor belt system, the impact of the load dropped on the belt causes rapid wear of the belt and of other parts of the conveyor system to which the forces of these impacts are transferred.

One object of the present invention is to provide a new and improved device for absorbing a great deal of the energy of impact of the load dropped on a conveyor belt at a loading or transfer station, so that the full force of this impact is not transmitted to the conveyor belt or to other parts of the conveyor system, thereby decreasing injury to the belt at this station and increasing its life.

For carrying out the objects of the present invention, there is provided within the ambit of the conveyor belt to be protected and directly below the upper run or reach of the belt at a loading or transfer station, a continuous cushioning belt driven at a linear speed equal to that of the conveyor belt. The upper run or reach of the cushioning belt adjoins the lower side of the upper run of the conveyor belt, extends parallel thereto and is desirably supported on impact idler pulleys, which also indirectly support the upper run of the conveyor belt. The cushioning belt comprises a layer of highly resilient shock absorbing or cushioning material for reducing the shock engendered by the dropping of the loads onto the conveyor belt at the loading or transfer station. This arrangement, by absorbing the forces of the impact of the loads, preserves the life of the conveyor belt and other parts of the conveyor system to which these forces might otherwise be fully transmitted.

As a further feature of the invention, the shock absorbing layer would be in the form of a layer of resilient cushions on a carrier or transmission belt retained thereon by means of a flexible sheet folded around and between the cushions to form pockets therefor and attached to the carrier belt by stitching, stapling or the like. The segmental construction of the shock absorbing layer permits said layer to flex properly when passing over the pulleys of the cushioning belt.

Various other objects, features and advantages of the invention are apparent from the following description and from the accompanying drawings, in which FIG. 1 is a side elevation partly diagrammaitc of a form of conveyor system with conveyor belt cushioning means embodying the present invention;

FIG. 2 is a detail fragmentary section of the cushioning means shown in conjunction with a portion of a conveyor belt protected thereby;

FIG. 3 is a detail enlargement of a portion of the cushioning means shown in FIG. 2;

FIG. 4 is a transverse section of the conveyor system taken on lines 4—4 of FIG. 2;

FIG. 5 is a transverse section of the system similar to that of FIG. 4 but showing the invention in connection with a system in which the run of the conveyor belt to be protected is troughed, and in which the cushioning belt is correspondingly designed to cooperate with said conveyor belt; and FIG. 6 is a transverse section of the cushioning belt employed in connection with the modification of FIG. 5, the cushioning belt, however, being shown extended transversely straight in the condition it will assume before assembling and troughing.

Referring to FIGS. 1–4 of the drawings, there is shown a conveyor belt system near a loading or transfer point, comprising the usual endless conveyor belt 10, made of the usual strong flexible material and trained at one end around a tail pulley 11 and at the other end around a drive pulley (not shown) to drive the belt in the direction indicated. This conveyor belt 10 is shown with an upper reach or run 12 extending substantially horizontally in a longitudinal direction and substantially straight and horizontal in a transverse direction. Over this belt run 12 is a load delivery or transfer feed device 13 shown in the form of a hopper through which the material to be loaded or transferred is discharged by gravity onto said belt run. The impact of this material onto the belt run 12 would wear out the conveyor belt 10 quickly, except for the cushioning means to be described.

To prevent damage to the conveyor belt resulting from the load impacts at the loading or transfer station, there is provided a cushioning belt system 15 located within the circuit of the conveyor belt 10 underneath the loading or transfer point of the conveyor system in position to receive the forces of load impact on the upper conveyor belt run 12. This cushioning belt system 15 comprises a continuous cushioning belt 16 which is trained around a tail pulley 17 with a take-up (not shown) for the cushioning belt and around a drive pulley 18 and which extends transversely across substantially the full width of the conveyor belt 10. The cushioning belt 16 has an upper run or reach 19 extending along the underside of the upper run 12 of the conveyor belt 10 and is in contact with or almost in contact with said conveyor belt run along at least the full field of impact of the loading or transfer hopper 13, so as to be in position to absorb the shock from the impact of the load dropped on said conveyor belt run.

The cushioning belt 16 comprises a layer of cushions 20 made of resilient cushioning material, such as foam rubber-like or elastomeric material, as for example, resilient foam polyurethane, laid on the outside of a carrier or transmission belt 21 and secured thereto by a continuous flexible cushion covering fabric sheet 22 folded around and between the cushions 20 to form pockets 23 therefor. The cushion retaining sheet 22 is wrapped conformably over the layer of cushions 20 and around the sides of the individual cushions and defines between cushions, spanning sections 24 seated against the carrier belt 21 and secured thereto, as for example, by stitching 25, or stapling or other suitable forms of attachments. Thus cushion retaining sheet 22 is desirably of multiple plies frictioned fabric and may be surface bonded to the cushions 20, if desired.

The cushions 20 are in the form of bars and are arranged in parallel relationship across the carrier belt 21, the length of each cushion being substantially equal to the width of the carrier belt to extend substantially across the full width thereof. The sides 26 of each cushion 20 slant towards each other to taper the cushion inwardly towards the carrier belt 21, so that the spanning sections 24 of the cushion retaining sheet 22 are formed for attachment to the carrier belt 21. The outer faces 27 of the cushions 20 are close together along the straight runs of the cushioning belt 16, so that they conjointly present almost a continuous uninterrupted surface to the upper run 12 of the conveyor belt 10, and the segmental relationship of the cushions is such as to permit the cushioning belt to flex properly when travelling around its pulleys 17 and 18.

The cushioning belt system is synchronized with the speed of the conveyor belt system, so that the two belts 10 and 16 move at the same linear speed. For that purpose, the drive pulley 18 for the cushioning belt 16 may be driven from the drive pulley (not shown) of the conveyor belt 10 by a drive connection 30, which may comprise a chain 31 passing over a sprocket 32 on the shaft of the pulley 18 and over a sprocket (not shown) on the shaft of the drive pulley of the conveyor belt 10, the diameters of the sprockets being so related as to attain the required belt synchronization. The two belt runs 12 and 19 thereby move together at the same speed.

As another alternative, the cushioning belt system 15 may be driven by a drive independent of that of the conveyor belt system through a variable speed drive to permit the cushioning belt 16 to be adjusted to the proper synchronized speed.

As a further alternative, the conveyor belt 10 may be driven at the same linear speed as the cushioning belt 16 by supporting the pulleys 17 and 18 of the cushioning belt on antifriction bearings and permitting the contact of the upper run 12 of the conveyor belt 10 with the upper run 19 of the cushioning belt 15 to frictionally drive said cushioning belt with said conveyor belt at the same speed.

The upper run 19 of the cushioning belt 16 is supported by a series of straight impact idlers 35 and the section of the upper run 12 of the conveyor belt 10 beyond the cushioning belt system 15 is supported by a series of straight or troughing idlers 36, only one being shown. The lower run 37 of the conveyor belt 10 is supported by straight idlers 38 and 40, the idler 40 being located underneath the lower run 41 of the cushioning belt 16 to support also said lower run of the cushioning belt. The distance between the outer faces of the two runs of the cushioning belt 16 corresponds to the distance between the inner faces of the two runs of the conveyor belt 10, so that the lower run 41 of the cushioning belt rests on the lower run 37 of the conveyor belt 10 and indirectly on the idler 40.

With the arrangement of FIGS. 1–4 as shown and described, the impact due to the fall of the material being loaded or transferred onto the conveyor belt 10 is transmitted to the resilient cushioning belt 16, causing the latter belt to absorb the shocks and forces of said material, so that the conveyor belt is not subjected to destructive action. This shock absorbing action of the cushioning belt 16 increases the useful life of the conveyor belt 10 substantially.

In the construction of FIGS. 1–4, the top run 12 of the conveyor belt 10, at least under the hopper 13 is transversely straight, requiring thereby a cushioning belt 16 which is also transversely straight. The nature of the material being loaded or the confining action of the hopper 13 may be such as not to require a troughed conveyor belt underneath the hopper 13. However, there may be situations requiring the upper run of the conveyor belt at the loading or transfer station to be troughed. FIGS. 5 and 6 show a modification to meet this situation. In this modification, each impact idler 35a corresponding to the impact idler 35 of FIGS. 1–4, instead of being straight and of single construction comprises three idler pulleys 50, 51 and 52 substantially of equal lengths connected by chain links 53 end to end in axially angular relationship to define a belt troughing support, the outer ends of the outside idler pulleys 50 and 52 being connected by chain links 54 to a conveyor frame (not shown), as in manner of the usual troughing idler pulleys.

The cushioning belt 16a is constructed to permit it to be troughed by the impact troughing idlers 35a, and for that purpose, comprises rows of cushions, each row extending transversely of the belt and consisting of three cushions 55, 56 and 57 corresponding in lengths substantially to the lengths of the idler pulleys 50, 51 and 52 respectively. These cushions 55, 56 and 57 of the same material as the cushions 20 in the construction of FIGS. 1–4, are arranged as a layer on a carrier or transmission belt 21a with the transverse rows of cushions following each other along the belt. A strip 22a of flexible fabric sheet, as for example, of multiple plies frictioned tension fabric, is conformably folded around and between the cushions 55 to form pockets therefor, a second fabric strip 22b of similar material is folded conformably around and between the cushions 56 to form pockets therefor, and a third fabric strip 22c of similar material is folded conformably around and between the cushions 57 to form pockets therefor. The sides of the cushions 55, 56 and 57 slant as do the sides 26 in the construction of FIGS. 1–4, to define between the base sections of adjoining cushions spanning fabric sheet sections 24a corresponding to the spanning sheet sections 24 of FIGS. 1–4, for attachment to the carrier belt 21a by stitching, stapling or the like.

In unstressed form, the cushioning belt 16a is transversely straight as shown in FIG. 6. In this condition, the outside cushions 55 and 57 have outer ends 60 extending substantially at right angles to their bases and have inner ends 61 slanting inwardly towards the base. The middle cushion 56 has its ends 62 slanting inwardly to form between the ends 61 of the outside cushions 55 and 57 and the ends 62 of the middle cushion 57, V-shaped channels 63, with their apices at the carrier belt 21a, permitting the outside cushions 55 and 57 to extend angularly in relation to the middle cushion 56, to permit the conveyor belt 10a to trough. The angle between confronting slanting ends 61 and 62 of the cushions 55, 56 and 57 forming the sides of the channels 63, may in a specific case be about 20°, to permit the outside cushions 55 and 57 in use to be raised 20° in relation to the middle cushion 56, and to close the V-shaped gaps 63 between the confronting ends of the cushions 55, 56 and 57. The three impact troughing idler pulleys 50, 51 and 52 will be correspondingly relatively angled to permit the upper run 12a of the conveyor belt 10a to be troughed.

Except as described, the modification of FIGS. 5 and 6 is similar in construction to that of FIGS. 1–4.

The cushioning belt 16a troughed as described, will support the upper run 12a of the conveyor belt 10a in troughed condition and absorb the impacts of the loads being dropped or transferred onto the conveyor belt 10a, as described in connection with FIGS. 1–4.

While the invention has been described with particular reference to specific modifications, it is to be understood that it is not to be limited thereto but is to be construed broadly and restricted solely by the scope of the appended claim.

What is claimed:

A conveyor system comprising an endless conveyor belt having an upper troughed run adapted to receive a load at a loading station, and means for absorbing the force of loading impact on said conveyor belt run at said station comprising an endless cushioning belt within the circuit of the conveyor belt having an upper troughed run extending along and directly underneath the upper run of said conveyor belt, a layer of resilient preformed cushions on the outside of said cushioning belt, arranged in rows, each row extending transversely of the carrier belt and consisting of three cushions to form three rows of cushions extending longitudinally of the cushioning belt, the confronting ends of the cushions in each transverse row slanting relatively to permit the cushioning belt with the cushions thereon to extend in angular relationship to trough in conformance with the trough configuration of the upper run of the conveyor belt, a flexible cushion covering sheet folded over the transverse rows of cushions and between said transverse rows and secured between said transverse rows to said cushioning belt, said cushion covering sheet comprising three units, each being conformably folded over a respective longitudinal row of cushions, the height of the covered cushions being sufficient to cause the covered cushions in the upper run of said cushioning belt to extend to and substantially in contact with the upper run of the conveyor belt to absorb the impacts of the loads delivered to said upper conveyor belt run, and means for operating said cushioning belt at a linear speed corresponding substantially to that of said conveyor belt.

References Cited in the file of this patent

UNITED STATES PATENTS

| | | |
|---|---|---|
| 463,110 | Dryden | Nov. 10, 1891 |
| 878,040 | Burke | Feb. 4, 1908 |
| 1,945,038 | Hand | Jan. 30, 1934 |

FOREIGN PATENTS

| | | |
|---|---|---|
| 444,099 | Germany | May 11, 1927 |